United States Patent [19]
Nagasawa

[11] Patent Number: 5,327,296
[45] Date of Patent: Jul. 5, 1994

[54] DUPLICATING SYSTEM FOR VIDEO AND AUDIO SIGNALS USING TIMEBASE COMPRESSION AND HIGH SPEED RECORDERS

[75] Inventor: Fumihiro Nagasawa, Kanagawa, Japan

[73] Assignee: Sony Corporation, Tokyo, Japan

[21] Appl. No.: 755,543

[22] Filed: Sep. 5, 1991

[30] Foreign Application Priority Data

Sep. 10, 1990 [JP] Japan .................. 2-239281

[51] Int. Cl.$^5$ .................. G11B 5/86; G11B 27/02
[52] U.S. Cl. .................. 360/15; 360/14.3
[58] Field of Search .......... 360/15, 13, 14.1–14.3; 369/84–85; 358/335

[56] References Cited

U.S. PATENT DOCUMENTS

| | | | |
|---|---|---|---|
| 4,329,719 | 5/1982 | Ninomiya et al. | 360/14.1 |
| 4,355,338 | 10/1982 | Yamamoto et al. | 360/15 |
| 4,800,230 | 2/1990 | Sherritt | 360/15 |
| 4,888,653 | 12/1989 | Cullum | 360/15 |

FOREIGN PATENT DOCUMENTS

| | | | |
|---|---|---|---|
| 0261826 | 3/1988 | European Pat. Off. | |
| 60-01628 | 1/1985 | Japan | 360/15 |
| 0246925 | 11/1986 | Japan | 360/15 |

OTHER PUBLICATIONS

Patent Abstracts of Japan, vol. 10, No. 12, (P-421) Jan. 17, 1986 & JP-A-60 167 123 (Matsushita) Aug. 30, 1985.
Patent Abstracts of Japan, vol. 12, No. 58 (P-669) Feb. 20, 1988 & JP-A-62 202 332 (Sony Corp.) Sep. 7, 1987.
Patent Abstracts of Japan, vol. 14, No. 341 (P-1081) Jul. 24, 1990 & JP-A-21 18 903 (Canon Inc.) May 7, 1990.

*Primary Examiner*—Aristotelis Psitos
*Assistant Examiner*—Jennifer Pearson
*Attorney, Agent, or Firm*—William S. Frommer; Alvin Sinderbrand

[57] ABSTRACT

A video signal is duplicated in a reduced time by using n video tape recording devices having rotary heads reproducing the video signal from respective recording media at a normal rotary head rotational speed and transporters transporting the respective recording media at n times a normal transport speed. The reproduced video signals are offset from each other by one frame of the video signal, and are timebase compressed, selectively delayed and combined into an n times normal speed reproduced signal, that is, a video signal with its timebase compressed by 1/n. The n times normal speed reproduced signal is recorded by at least one video tape recorder on a recording medium at an n times normal recording speed, thereby duplicating the original video signal. An audio signal may also be duplicated in this manner.

9 Claims, 3 Drawing Sheets

DUPLICATING SYSTEM FOR VIDEO AND AUDIO SIGNALS USING TIMEBASE COMPRESSION AND HIGH SPEED RECORDERS

BACKGROUND OF THE INVENTION

1. Field of the Invention

The present invention generally relates to video signal duplicating systems in which a video signal is reproduced from a first record medium and a reproduced video signal is recorded on a second record medium. More particularly, this invention relates to a video signal duplicating system in which a video signal is duplicated at a speed higher than the normal playback speed.

2. Description of the Related Art

When a video information such as a movie or the like is reproduced from a video tape and then recorded on another video tape, a playback video tape recorder (VTR) and a recording VTR are both driven at a speed, for example, which is twice as high as the normal speed and a twice normal speed reproduced signal is input to the recording VTR in order to reduce the duplicating time. A twice normal speed reproduced signal has a rate which is twice the normal rate, that is, its timebase is compressed by ½.

As a method for obtaining the twice normal speed reproduced signal from the playback VTR, the following two methods (1) and (2) have been proposed. In the method (1), both a transport speed of a video tape (record medium) and a driving speed of a reproducing system such as a rotary head drum or the like are increased to twice normal speed, and according to the method (2), the number of playback heads mounted on the rotary head drum is increased to twice the normal number.

However, according to the method (1), a revolution rate of a rotary head is considerably increased. For example, in a video tape recorder of D2 type described in U.S. Pat. No. 5,012,361, the revolution rate of the rotary head reaches 10800 r.p.m. so that, in actual practice, various technical problems must be solved. Furthermore, since a signal of twice the normal frequency band is delivered from the playback head, the signal processing system of the existing video tape recorder must be modified greatly.

The method (2) needs a special rotary head drum and a special playback head and also needs two signal processing systems, which requires the existing video tape recorder to be modified greatly.

Therefore, in accordance with the methods (1) and (2), the development period of the video tape recorder is extended and the development cost or the like also is increased. In addition, the methods (1) and (2) cannot satisfy the user's requests in the early stage.

OBJECTS AND SUMMARY OF THE INVENTION

Accordingly, it is an object of the present invention to provide an improved video signal duplicating system in which the aforementioned shortcomings and disadvantages encountered with the prior art can be eliminated.

More specifically, it is an object of the present invention to provide a video signal duplicating system in which a video signal can be duplicated at a speed n times as high as the normal playback speed without increasing the rotational speed of a rotating head of each of the playback video tape recorders to more than the normal head rotational speed.

As an aspect of the present invention, an apparatus for duplicating a video signal is comprised of a plurality of n video tape recorders each having a record medium on in which the video signal is recorded on, transport means for transporting the record medium at a speed n times as high as a normal transport speed, and rotary head means for reproducing the video signals from the n record media at respective positions offset from each other by one frame of the video signal, the rotary head means having a normal rotary head rotational speed, signal processing means for timebase-compressing the video signals reproduced by the plurality of n video tape recorders, delaying at least one of the timebase compressed video signals, and outputting an n-times normal speed reproduced signal, and at least one additional video tape recorder having rotary head means for recording the n times normal speed reproduced signal from the signal processing means on a respective record medium at a speed n times as high as a normal recording speed.

The above and other objects, features, and advantages of the present invention will become apparent in the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

An embodiment of the video signal duplicating system according to the present invention will now be described with reference to the drawings.

Figure 1:
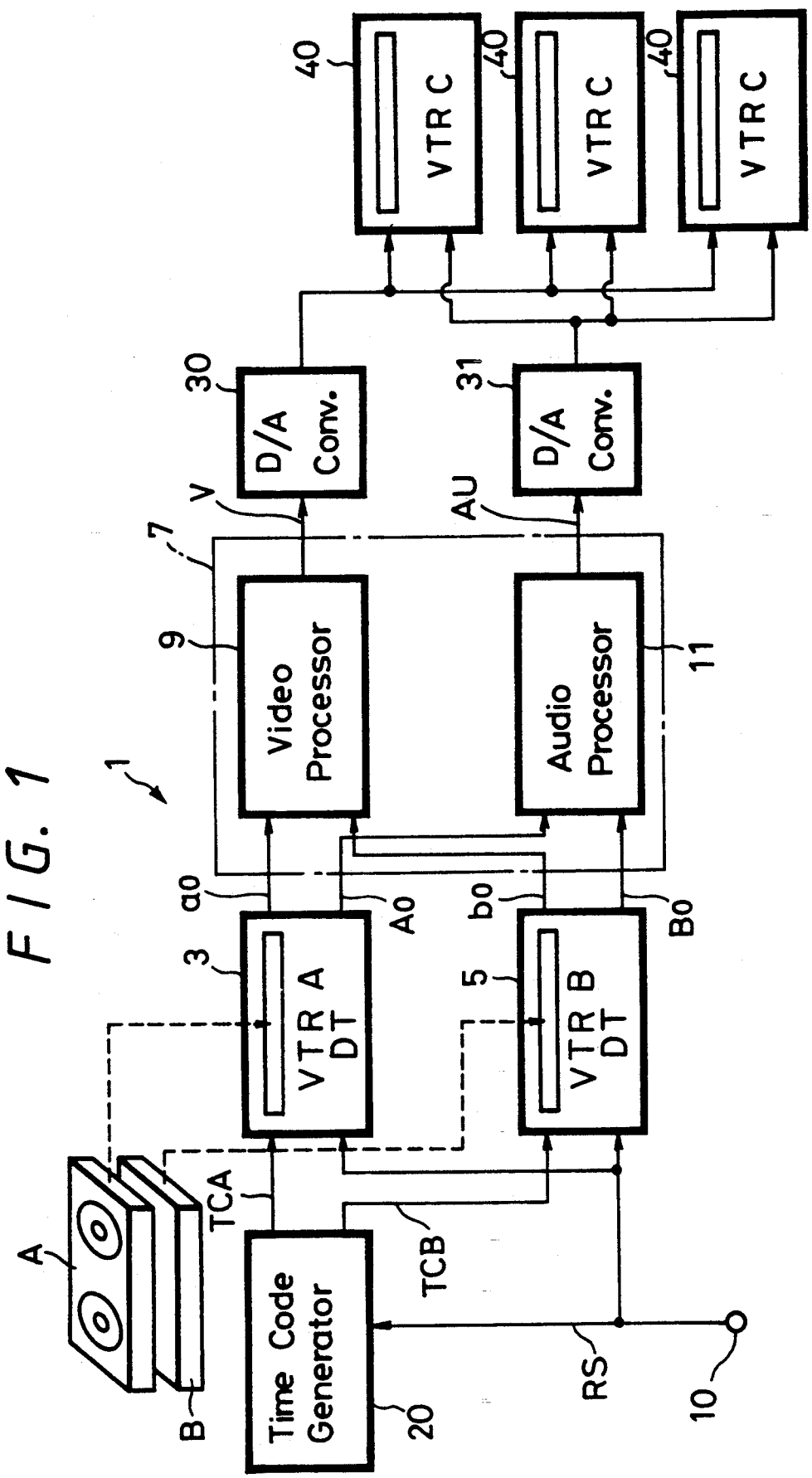
FIG. 1 is a schematic block diagram showing an embodiment of video signal duplicating system according to the present invention.

Referring to FIG. 1, it will be seen that video tapes (record media) A, B are respectively loaded onto two (n=2) digital video tape recorders (VTRs) 3, 5.

The same information signal (e.g., video and audio signals of the same movie) is recorded on the video tapes A, B and the two video tape recorders 3, 5 are driven in phase with each other by a playback operation instruction signal (RS) supplied thereto from an external control apparatus (not shown) through a terminal 10 and by output signals TCA, TCB supplied from a time code generator 20.

Reproduced signals from the video tape recorders 3, 5 are supplied to a signal processor 7, in which they are processed in a predetermined manner to provide twice normal speed reproduced signals.

In this embodiment, according to the thus arranged system, a video signal $a_0$, an audio signal $A_0$ from the video tape recorder 3 and a video signal $b_0$, an audio signal $B_0$ from the video tape recorder 5 are processed to provide the twice normal speed reproduced signals, respectively. In this case, the audio signals $A_0$, $B_0$ are processed similarly to the video signals $a_0$, $b_0$ and therefore only the processing procedure of the video signals $a_0$, $b_0$ will be described below.

Figure 2:
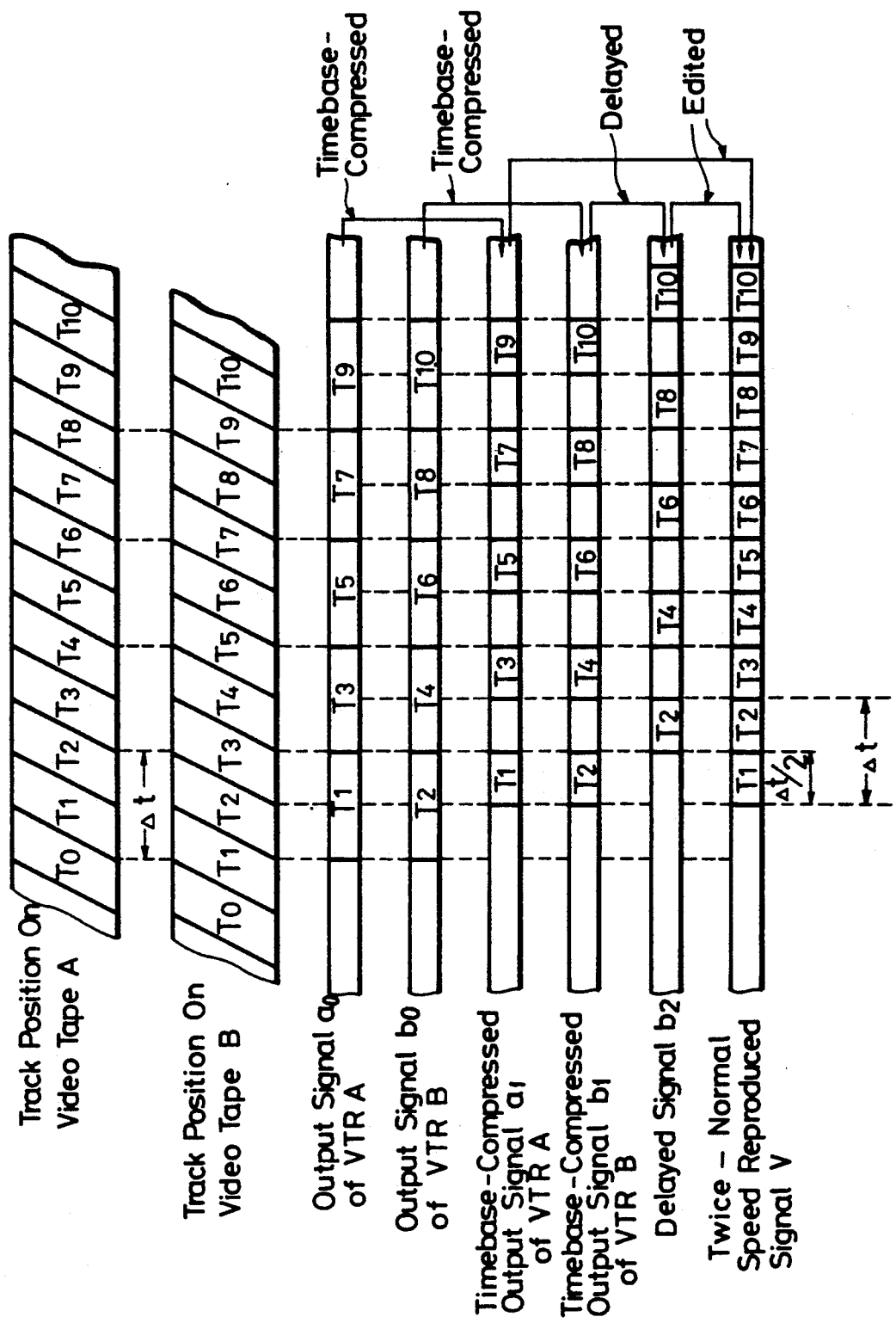
FIG. 2 is a schematic representation used to explain operation of the video signal duplicating system shown in FIG. 1.

In a first step, as shown in FIG. 2, the playback start position of the video tape B is located at the position (track $T_2$) which is offset by one frame from the playback start position (track $T_1$) of the video tape A. Also, the video tape recorders 3 and 5 are driven in phase with each other so that the video tapes A, B start being reproduced at the same time.

In the example of FIG. 2, the time code TCB is supplied from the time code generator 20 to the video tape recorder 5 at a time $\Delta t$ of one frame before the time code TCA is supplied to the video tape recorder 3, whereby the reproduction start position of the video tape B is offset by one frame.

Driving portions of playback systems, such as a rotary head drum or the like of the video tape recorders 3, 5 are placed in the normal speed mode, that is, in the mode in which all tracks $T_0$ to $T_{10}$ are sequentially scanned to provide a normal image. In this case, the tracking control is carried out by using a piezoelectric element ( i. e., dynamic tracking playback ). Furthermore, the two video tapes A, B are transported at a speed twice as high as the transport (drive) speed of the standard speed mode.

By the above-mentioned reproducing method, the VTR 3 produces the signal $a_0$ (contents of tracks $T_1$, $T_3$, $T_5$, $T_9$) and the VTR 5 produces the signal $b_0$ (contents of tracks $T_2$, $T_4$, $T_6$, $T_8$, $T_{10}$), respectively. In FIG. 2, $\Delta t$ is selected to be, for example, one-thirtieth of a second.

Figure 3:
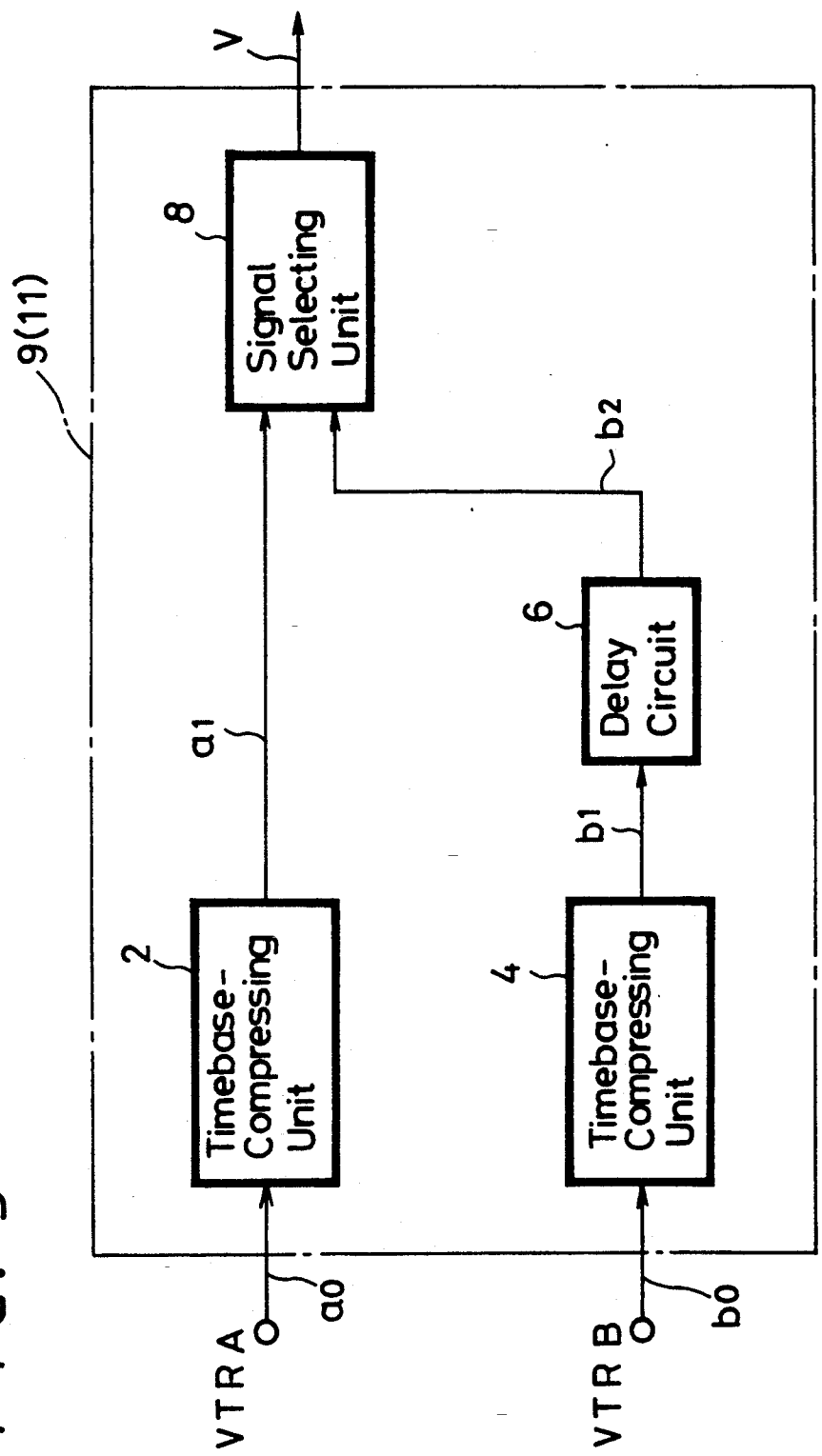
FIG. 3 is a schematic block diagram showing an example of a video processor used in the video signal duplicating system shown in FIG. 1.

In a second step, the signals $a_0$, $b_0$ are supplied to a video processor 9 of the signal processor 7 and from FIG. 3, it will be seen that the signals $a_0$, $b_0$ are respectively supplied to timebase-compressing units 2 and 4.

In the timebase-compressing units 2 and 4, the signals $a_0$ and $b_0$ are timebase-compressed (i.e., compressed to $\Delta t/2$) to produce signals $a_1$, $b_1$, respectively.

In a third step, the signal $a_1$ is supplied to a signal selecting unit 8 and the signal $b_1$ is supplied through a delay circuit 6 to the signal selecting unit 8. In this case, since the signal $b_1$ is delayed to become a signal $b_2$ by a delay time of $\Delta t/2$ by the delay circuit 6, the signal $b_2$ is supplied to the signal selecting unit 8 after the signal $a_1$ by the delay time $\Delta t/2$.

The signal selecting unit 8 functions (i.e., organizes the signals $a_1$, $b_2$) such that the signals $a_1$, $b_2$ sequentially supplied thereto are output therefrom in the sequential order of the video signals recorded on the video tape A (or B) in the first stage, (i.e., in the sequential order of the tracks $T_1$ through $T_{10}$), whereby the content of each of the tracks $T_1$ to $T_{10}$ is reproduced within the time $\Delta t/2$. As a consequence, the signal selecting unit 8 (video processor 9) produces a signal V which is equivalent to a signal which results from reproducing the video signal of the video tape A at speed twice as high as the normal speed.

In a like manner, the audio signals $A_0$, $B_0$ respectively produced from the VTRs 3, 5 are delivered from the audio processor 11 as a twice normal speed reproduced signal AU.

In general, when the video signals $a_0$, $b_0$ are obtained by the DT playback, the color framings in the playback mode must be generally made coincident with each other by, for example, a professional video tape recorder. As a consequence, if the playback operation instructing signal RS is not coincident with the color framing in the recording mode of the video signal in the video tape A, then color framing processing for making the color framings of the reproduced signals coincident is carried out.

In this embodiment, the color framing must be coincident with that of only the finally obtained signal V so that the arrangement (circuit and so on) for carrying out the conventional color processing is not needed.

Further, although interpolation processing is generally carried out for interpolating discontinuous portions of the audio signals $A_0$, $B_0$, the final signal AU may be sufficiently continuous, thus the arrangement (circuit or the like) necessary for the interpolation processing is not required.

The reproduced signals V and AU reproduced by the digital video tape recorders 3, 5 and which are processed as the twice normal speed signals by digital-to-analog (D/A) converters 30, 31 are duplicated on the video tapes by a plurality of analog video tape recorders C (40) which can record the signal at a speed twice as high as the normal speed. Either of the methods (1) or (2) described above in the Background section can be employed to record the signal at a speed twice as high as the normal speed.

As described above, according to this embodiment, the video tape B starts being reproduced from the position offset from the video tape A by one frame and the reproduced signals $a_0$, $b_0$ from the video tape recorders 3, 5 are timebase-compressed by $\Delta t/2$. respectively.

Then, the signal $b_0$ is delayed by a delay time of $\Delta t/2$ as the signal $b_2$ which is then supplied to the signal selecting unit 8 and the signals $a_1$, $b_2$ are alternately selected and output by the signal selecting unit 8, thereby the final twice normal speed produced signal V being reproduced. Accordingly, the video tape recorders 3, 5 can be designed by only carrying out a small modification in which the arrangements for effecting, for example, the color framing and interpolation processings or the like are removed.

Therefore, since the development period of the video tape recorders 3, 5 can be reduced, the video signal duplicating system of the present invention is an improvement from an economical standpoint, such as a reduction of the development cost or the like. Furthermore the video signal duplicating system of the present invention can satisfy the requirements of the user early and can be improved from a user services standpoint.

The video signal duplicating system of the present invention is not limited to the two video tape recorders 3, 5 and can be applied to the reproduction done by n video tape recorders and n video tapes, in which B is an even number, for example, n=4, 6, 8 etc.

As will be understood from the above description, according to the video signal duplicating system of the present invention, information signals offset by one frame each are reproduced from n record media, the reproduced signals are timebase-compressed by 1/n and organized in the recording order of the original information signals, thereby an n times normal speed reproduced signal, corresponding to a signal obtained by reproducing at a speed n times as high as the normal reproduction speed, is obtained.

Therefore, a large modification of the video tape recorder for reproducing a record medium is not needed, whereby the development period of the video tape recorders is reduced, the video signal duplicating system of the present invention is an improvement from an economical standpoint, such as the reduction of the development cost or the like, and the video signal duplicating system of the present invention can satisfy the requirements of the user early and can be improved from a user services standpoint.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. An apparatus for duplicating a video signal having video frame intervals, comprising:
   a plurality n of video tape reproducing devices, each video tape reproducing device having a record medium on which said video signal is recorded and transport means for transporting said record medium at a speed n times as high as a normal transport speed and rotary head means having a normal rotary head rotational speed for reproducing said video signal from said record medium to produce a reproduced video signal, the reproduced video signals produced by said plurality n of video tape reproducing devices offset from each other by one of said frame intervals;
   signal processing means for timebase-compressing said reproduced video signals, delaying at least one of the timebase-compressed video signals, and outputting an n-times normal speed reproduced signal; and
   at least one video tape recorder having rotary head means for recording the n-times normal speed reproduced signal from said signal processing means on a respective additional record medium at a speed n times as high as a normal recording speed.

2. An apparatus for duplicating a video signal according to claim 1, further comprising:
   a time code generator for generating a reference time code signal for each of said plurality n of video tape reproducing devices, said reference time code signals differing from each other by a delay time corresponding to one of said frame intervals of said video signal, and wherein each of said plurality n of video tape reproducing devices reproduces said video signal from said record medium in response to the respective reference time code signal generated therefor.

3. An apparatus for duplicating a video signal according to claim 1, wherein said signal processing means comprises a plurality n of timebase-compressing means each for compressing a time base of a respective video signal reproduced by a respective one of said plurality n of video tape reproducing devices by 1/n, a plurality (n−1) of delay means for delaying respective timebase-compressed signals from (n−1) of said plurality n of timebase-compressing means by a predetermined delay time, and signal selecting means for selectively outputting delayed signals from said plurality (n−1) of delay means and at least one timebase-compressed signal from said timebase-compressing means as a selected signal and further comprising digital-to-analog converting means for converting said selected signal into an analog signal.

4. An apparatus for duplicating a video signal according to claim 3, wherein said at least one video tape recorder is an analog video tape recorder.

5. An apparatus for duplicating a video signal according to claim 1, in which n is an even number.

6. An apparatus for duplicating a video signal according to claim 1, in which said at least one video tape recorder also includes transport means for transporting said respective additional record medium using a transport speed n times as high as said normal transport speed, and wherein said rotary head means of said at least one video tape recorder has a rotational speed n times as high as said normal rotary head rotational speed.

7. An apparatus for duplicating a video signal according to claim 1, wherein said rotary head means of said at least one video tape recorder has a number of rotary heads which is n times a normal number of rotary heads.

8. An apparatus for duplicating a video signal according to claim 1, wherein each of said reproducing devices includes dynamic tracking control means for dynamically controlling tracking of said rotary head means.

9. An apparatus for duplicating an audio signal having frame intervals, comprising:
   a plurality n of audio tape reproducing devices, each audio tape reproducing device having a record medium on which said audio signal is recorded and transport means for transporting said record medium at a speed n times as high as a normal transport speed and rotary head means having a normal rotary head rotational speed for reproducing said audio signal from said record medium to produce a reproduced audio signal, the reproduced audio signals produced by said plurality n of audio tape reproducing devices offset from each other by one of said frame intervals;
   signal processing means for timebase-compressing said reproduced audio signals, delaying at least one of the timebase-compressed audio signals, and outputting an n-times normal speed reproduced signal; and
   at least one audio tape recorder having rotary head means for recording the n-times normal speed reproduced signal from said signal processing means on a respective additional record medium at a speed n times as high as a normal recording speed.

* * * * *